Patented July 17, 1934

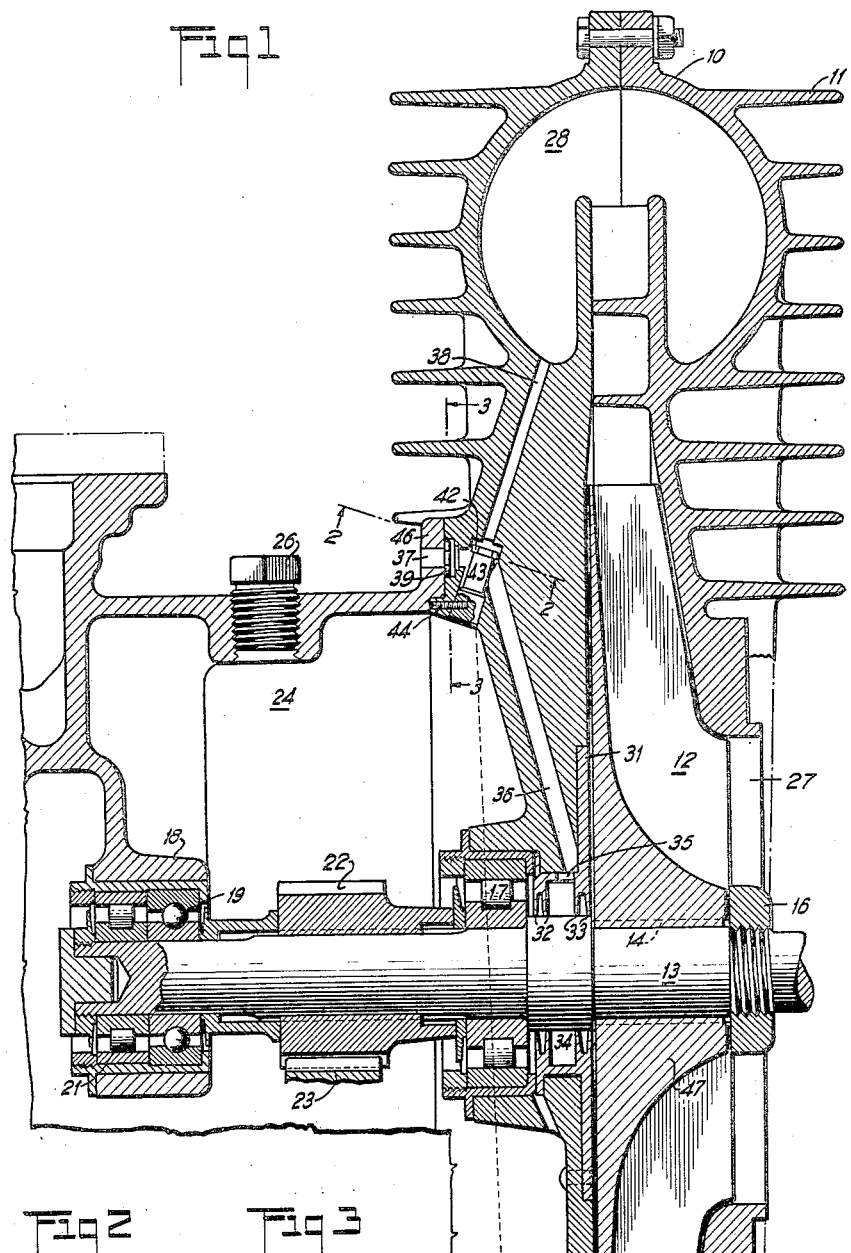
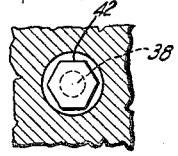
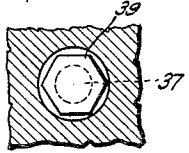

1,966,855

UNITED STATES PATENT OFFICE 1,966,855

LUBRICATION SHIELD FOR SUPER-
CHARGERS

David Gregg, Caldwell Borough, N. J., assignor
to Bendix Research Corporation, East Orange,
N. J., a corporation of Indiana Application August 5, 1931, Serial No. 555,326

15 Claims. (Cl. 230—132)

This invention relates to means for preventing oil leakage into fluid compressors or pumps.

An important object of the invention is to provide a compressor with an oil control that reduces the oil leakage into the body of the compressor under various operating conditions.

Another object of the invention is to provide a fluid compressor with an oil control in which the discharge passage of the compressor is shielded against oil leakage irrespective of the pressure in the passage.

Another object of the invention is to provide an oil control for a fluid compressor in which either atmospheric or super-atmospheric pressure is present adjacent the rotary element of the pump.

Another object of the invention is to provide a rotary fluid compressor with a selective barometric control of pressure relief conduits which lead from the atmosphere and the supercharger discharge passages to a point adjacent the bearing of the rotary element of the pump.

Another object of the invention is to provide an intervening gaseous shield between the compressor impeller and its lubricated driving parts.

Other objects and features of the invention will be apparent from the following description, in connection with which a preferred embodiment of the invention has been illustrated in the accompanying drawing, in which:

Fig. 1 is a sectional view through a portion of a supercharger or gas compressor;

Fig. 2 is a section taken along the lines 2—2 of Fig. 1 showing the construction of the check valve installed in the conduit leading to the discharge passage; and, Fig. 3 is a sectional view taken on lines 3—3 of Fig. 1 showing the construction of the atmospheric check valve.

Referring to the drawing, 10 is the housing of a supercharger having cooling fins 11, within which is a rotary impeller 12 secured to shaft 13 by any desired means, such as splines 14 and nut 16. Shaft 13 is rotatably mounted in the housing by bearing 17 and has its inner end rotatably mounted in engine crankcase 18 by bearings 19 and 21, bearing 21 being of the roller type and bearing 19 being preferably of a type capable of absorbing some axial thrust. Shaft 13 and impeller 12 are driven by gear 22 secured to shaft 13 between the bearings and meshed with the driving gear 23, gears 22 and 23 being enclosed in compartment 24 which is adapted to hold a quantity of lubricant introduced therein by means of removable plug 26. It is desirable that gears 22 and 23 and the shaft bearings be lubricated at all times and that the lubricant be confined to compartment 24. Leakage into the compressor will result in a rapid consumption of the oil and permit it to be carried by the air entering inlet opening 27 into the discharge passage 28, wherefrom it will be delivered to the engine and possibly interfere with the efficient operation thereof.

To guard against the introduction of oil into the compressor, an oil guard 31 is provided between the impeller and the compartment 24 which comprises inwardly extending flanges 32 and 33 substantially touching shaft 13 but preferably having a slight clearance with respect to the shaft to prevent accidental rubbing. Flanges 32 and 33 are spaced slightly apart and define an annular enclosure 34 in communication by means of opening 35 with an upwardly extending conduit 36 having communication with atmospheric conduit 37 and conduit 38 which is in communication with discharge passage 28. Inwardly opening check valves 39 and 42 are provided in conduits 37 and 38 respectively, which are adapted to selectively provide communication between the conduit and either discharge passage 28 or the atmosphere, depending on the pressure existing in discharge passage 28. Any desired means, such as plug 43 and screw 44, may be used to hold check valve 42 in position, and check valve 39 may be conveniently located against displacement by inserting it in opening 37 prior to the assembly of the flanged portion 46 of compartment 24 with the main body 10 of the supercharger.

In the operation of the supercharger, compartment 24, because of the lubricant thrown from gears 22 and 23, is normally filled with an oily mist which tends to be drawn into the supercharger by the sub-atmospheric pressure existing adjacent the impeller hub 47. During the greater portion of the time, a super-atmospheric pressure exists in passage 28, which is communicated to passage 38 and causes the hexagonal check valve 42 to assume its open position against plug 43, as shown in Fig. 1, and permit the air to flow downwardly from discharge passage 28 through conduit 36 and opening 35 into the enclosure 34, for relieving any vacuum which may exist therein and which might have a tendency to draw oil from compartment 24 into the compressor.

If for any reason the air leading to inlet passage 27 is throttled sufficiently to cause a sub-atmospheric pressure to exist in passage 28, check valve 42 will be moved upwardly and will shut off communication between conduit 38 and conduit 36. Under these conditions, any vacuum existing in enclosure 34 will be broken by atmospheric air entering through opening 37 and past check valve 39 into the conduit 36.

It may be readily seen from the foregoing description that, irrespective of the pressure existing in the supercharger discharge passage 28, the portion of shaft 13 that is intermediate the impeller hub 14 and the lubricated gears 22 and 23, is subjected to either atmospheric or super-atmospheric pressure, and that the danger of oil leakage from compartment 24 into the body of the supercharger has been practically eliminated.

While a preferred embodiment of the invention has been illustrated and described, it is understood that this showing and description are illustrative only and that the invention is not regarded as limited to the form illustrated and described, or otherwise, except by the terms of the following claims:

What is claimed is:

1. In a fluid compressor having a discharge passage occasionally subjected to sub-atmospheric pressure, an impeller, a lubricated driving mechanism for the impeller, a conduit leading from the passage to a point intermediate impeller and the mechanism, and a pressure actuated valve controlling fluid flow through the conduit, said valve being actuated by the differential in pressure between the passage end of the conduit and the opposite end thereof.

2. In a fluid compressor having a discharge passage subjected to pressure variations above and below atmospheric pressure, an impeller, a lubricated driving mechanism therefor, a conduit leading from the passage to a point intermediate the central portion of the impeller and the mechanism, and a check valve in the conduit adapted to open when the pressure in the discharge passage is above the pressure at the impeller end of the conduit.

3. In a fluid compressor having a discharge passage subjected to pressure variations above and below atmospheric pressure, an impeller, a lubricated driving mechanism therefor, a conduit leading from the passage to a point intermediate the impeller and the mechanism, and a check valve in the conduit adapted to open when the pressure in the discharge passage is above atmospheric pressure, and means for admitting atmospheric air to the conduit when the pressure within the passage is sub-atmospheric.

4. In a fluid compressor having a discharge passage, an impeller having a shaft, a lubricated drive mechanism for the shaft, a conduit open to the shaft intermediate the impeller and the mechanism, an atmospheric conduit, a conduit leading to the passage, all of said conduits having communication with each other, and means for connecting the shaft conduit with one of the other conduits having the higher fluid pressure, and means for closing the shaft conduit to the remaining conduit.

5. In a fluid compressor having a discharge passage, an impeller having a shaft, a lubricated drive mechanism for the shaft, a conduit open to the shaft intermediate the impeller and the mechanism, an atmospheric conduit, a conduit leading to the passage, all of said conduits having communication with each other and a check valve opening toward the shaft conduit in each of the other conduits.

6. In a fluid compressor having a housing and a discharge passage subjected to wide variations in pressure, an impeller having a shaft rotatably mounted in the housing, lubricated driving mechanism for the shaft, and pressure actuated means for selectively communicating compressor and atmospheric pressures to the shaft intermediate the impeller and mechanism whereby the pressure at the shaft is at least atmospheric pressure irrespective of whether the passage pressure is above or below atmospheric pressure.

7. In a fluid compressor having a housing and a discharge passage subjected to wide variations in pressure, an impeller having a shaft rotatably mounted in the housing, lubricated driving mechanism for the shaft, means for selectively communicating compressor and atmospheric pressures to the shaft intermediate the impeller and mechanism whereby the pressure at the shaft is at least equal to atmospheric pressure, and means for preventing fluid flow from the passage direct to atmosphere.

8. In a fluid compressor having a discharge passage intermittently subjected to sub-atmospheric pressure, an impeller having a shaft, a housing for the impeller having lubricated parts therein, a lubricant guard for the shaft located between the lubricated parts and the impeller, said guard including flanges substantially contiguous to the shaft defining an annular enclosure, and means for selectively connecting said enclosure to atmospheric and discharge passage pressures to prevent the pressure within the enclosure from becoming sub-atmospheric.

9. In a fluid compressor having a discharge passage intermittently subjected to sub-atmospheric pressure, an impeller having a shaft, a housing for the impeller having lubricated parts therein, a lubricant guard for the shaft located between the lubricated parts and the impeller, said guard including flanges substantially contiguous to the shaft defining an annular enclosure, and pressure operated means for selectively connecting said enclosure to atmospheric and discharge passage pressures whereby the enclosure is protected against sub-atmospheric pressure in the discharge passage.

10. In a fluid compressor having a discharge passage intermittently subjected to sub-atmospheric pressure, an impeller having a shaft, a lubricated driving mechanism for the shaft, a lubricant guard including flanges substantially contiguous to the shaft and defining an enclosure, a conduit leading from the enclosure having openings to the passage and atmosphere respectively, and a check valve controlling each opening adapted to prevent fluid flow toward the openings.

11. In a fluid compressor having a discharge passage subjected to variations above and below atmospheric pressure, a lubricated driving mechanism for the compressor, a driving shaft, a conduit leading from the passage to the shaft at a point intermediate the compressor and the mechanism, a check valve in the conduit adapted to open when the pressure in the discharge passage is above atmospheric pressure, and means for admitting atmospheric air to the conduit when the pressure within the passage is sub-atmospheric.

12. In a fluid compressor having a discharge passage, a driving shaft for the compressor, means enclosing a space on the shaft adjacent the compressor, a conduit leading to said space, an atmospheric conduit, a conduit leading to the discharge passage, means for connecting the conduit leading to the space with the one of the other conduits having the higher fluid pressure, and means for closing the space conduit to the remaining conduit.

13. In a fluid compressor having a discharge passage and a driving shaft, means enclosing a space on the shaft adjacent the compressor, a conduit in communication with the space, an atmospheric conduit, a conduit leading to the passage, all of said conduits having communication with each other, and a check valve opening toward the space conduit in each of the other conduits.

14. In a fluid compressor having a housing and a discharge passage, a drive shaft rotatably mounted in the housing, lubricated driving mechanism for the shaft, and pressure actuated means for selectively communicating compressor and atmospheric pressures to the shaft intermediate the compressor and mechanism whereby the pressure at the shaft is at least atmospheric pressure irrespective of whether the passage pressure is above or below atmospheric pressure.

15. In a fluid compressor having a housing and a discharge passage subjected to wide variations in pressure, a drive shaft for the compressor rotatably mounted in the housing, lubricated driving mechanism for the compressor, means for selectively communicating compressor and atmospheric pressures to the shaft intermediate the compressor and the mechanism whereby the pressure at the shaft is at least equal to the atmospheric pressure, and means for preventing fluid flow from the passage direct to the atmosphere.

DAVID GREGG.